(12) United States Patent
Nelson et al.

(10) Patent No.: US 11,483,148 B2
(45) Date of Patent: Oct. 25, 2022

(54) BATCH TRANSFER OF CONTROL OF MEMORY DEVICES OVER COMPUTER NETWORKS

(71) Applicant: Micron Technology, Inc., Boise, ID (US)

(72) Inventors: Travis Duane Nelson, Boise, ID (US); Lance W. Dover, Fair Oaks, CA (US)

(73) Assignee: Micron Technology, Inc., Boise, ID (US)

( * ) Notice: Subject to any disclaimer, the term of this patent is extended or adjusted under 35 U.S.C. 154(b) by 7 days.

(21) Appl. No.: 17/150,849

(22) Filed: Jan. 15, 2021

(65) Prior Publication Data

US 2022/0231839 A1    Jul. 21, 2022

(51) Int. Cl.
*H04L 9/08* (2006.01)
*H04L 9/32* (2006.01)
*H04L 9/40* (2022.01)

(52) U.S. Cl.
CPC .......... *H04L 9/088* (2013.01); *H04L 9/3247* (2013.01); *H04L 63/08* (2013.01)

(58) Field of Classification Search
CPC ........ H04L 9/088; H04L 9/3247; H04L 63/08
USPC .......................................................... 713/168
See application file for complete search history.

(56) References Cited

U.S. PATENT DOCUMENTS

| | | | |
|---|---|---|---|
| 9,530,027 B2* | 12/2016 | Shahidzadeh | ......... H04L 9/3242 |
| 2006/0248346 A1 | 11/2006 | Shiomi et al. | |
| 2010/0071030 A1 | 3/2010 | Rosenan et al. | |
| 2013/0061291 A1 | 3/2013 | Hegg et al. | |
| 2013/0262877 A1 | 10/2013 | Neve De Mevergnies et al. | |
| 2014/0281563 A1 | 9/2014 | Nagai et al. | |
| 2019/0294765 A1 | 9/2019 | Fine et al. | |
| 2019/0319799 A1* | 10/2019 | Suresh | ..................... G09C 1/00 |
| 2020/0210596 A1 | 7/2020 | Cariello et al. | |

FOREIGN PATENT DOCUMENTS

KR     20090071307     7/2009

OTHER PUBLICATIONS

International Search Report and Written Opinion, PCT/US2022/011458, dated Apr. 27, 2022.

* cited by examiner

*Primary Examiner* — Benjamin A Kaplan
(74) *Attorney, Agent, or Firm* — Greenberg Traurig

(57) ABSTRACT

A system, method and apparatus to control memory devices over computer networks. For example, a server system establishes a secure authenticated connection with a client computer system to receive a request having a batch identification that is configured in the server system to identify a batch of multiple memory devices. After determining that the client computer system is eligible to control the multiple memory devices in the batch, the server system transmits to the client computer system a response. The response contains control data for each respective memory device in the batch. The control data is based on at least a cryptographic key stored in the server system in association with the respective memory device. Using the control data the client computer system submits a command with a digital signature to the respective memory device, which validates the digital signature prior to execution of the command.

20 Claims, 9 Drawing Sheets

BATCH TRANSFER OF CONTROL OF MEMORY DEVICES OVER COMPUTER NETWORKS

TECHNICAL FIELD

At least some embodiments disclosed herein relate to computer security in general, and more particularly, but not limited to control of security operations of memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
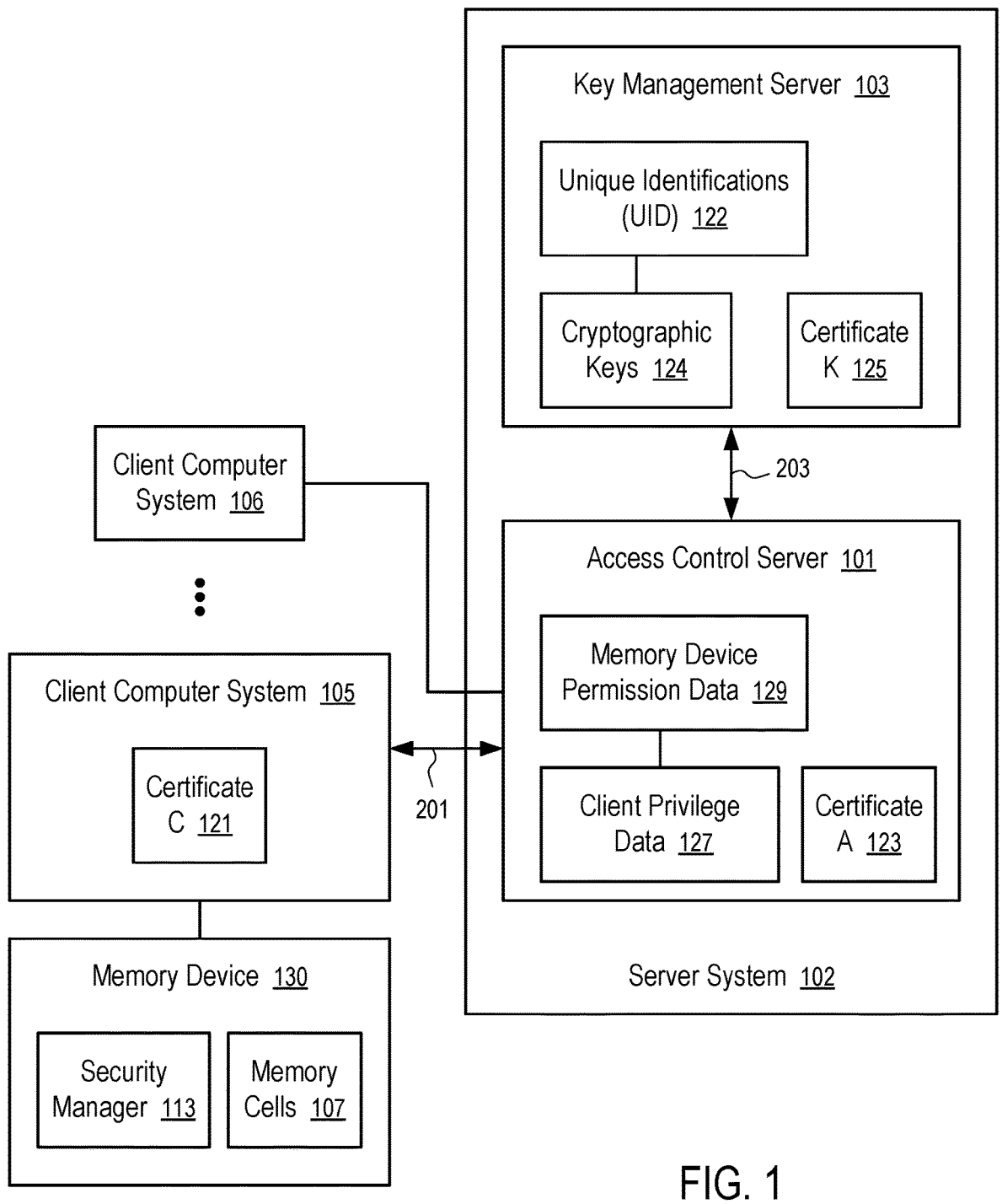
FIG. 1 shows a server system configured to control memory devices according to one embodiment.

At least some aspects of the present disclosure are directed to a server system configured to control memory devices, such as the activation of security features of the memory devices, transfer of privileges of instructing memory devices to perform security operations, etc.

A memory device can be manufactured to include a security manager. The security manager can be activated to exercise control over access to memory cells in the memory device. The access control can be implemented using cryptographic techniques. For example, an entity in possession of a cryptographic key can be provided with privileges of instructing the memory device to perform restricted operations. Examples of such operations can include changing a security setting or configuration of the memory device, reading a portion of the memory cells in the memory device, writing data into a portion of the memory cells, deleting data from a portion of the memory cells, updating data in a portion of the memory cells, etc. It is a challenge to secure cryptographic keys used in the access control and to secure the transfer of the privileges.

At least some aspects of the present disclosure address the above and other deficiencies and/or challenges by a server system having a key management server and an access control server.

The key management server is configured to secure cryptographic keys and secure computations involving the cryptographic keys. The key management server implements operations involving cryptographic keys that are not specific to memory devices and clients. Thus, the functionality of the key management server can be limited, simplified, and/or standardized to improve security.

The access control server stores client information and is configured to perform computations and/or security tasks specific to different clients and/or different memory devices. The access control server is configured between the key management server and client computer systems to which memory devices are connected. Client computer systems request the access control server to provide responses that involve the cryptographic keys stored in the key management server. The access control server processes the requests to determine whether to use the service of the key management server to generate responses. The access control system can function as a gatekeeper and/or proxy for the key management server, rejecting connections from computer systems that are not whitelisted, protecting the key management server from deny of service (DoS) attacks, and implementing operations that are client/device specific using the cryptographic key management functionality of the key management server. By controlling access to the key management server, the access control server can reduce security risks to the key management server and provide rich services to accommodate various types of memory devices, control activities, and client preferences.

A memory device can be configured to have an unique identity. The identity can be authenticated using cryptographic techniques to prevent counterfeit devices and/or tampered devices from accessing services and prevent insecure operations. The identity can be generated based on the hardware of the memory device and selected data stored in the memory device to represent the combination of the hardware and software of the memory device as a whole. Further, the memory device can be configured to provide, to entities in possession of one or more cryptographic keys, the privileges of requesting the memory device to execute commands relevant on secured aspects of the memory device. The key management server can be used in the validation of the unique identity of the memory device and in the transfer of the privileges.

For example, a memory device can store a secret for its authentication. During the manufacture of the memory device in a secure facility, a unique device secret (UDS) can be injected in the memory device and stored in a protected and access-controlled area of the memory device. According to standards and/or implementations of Device Identity Composition Engine (DICE) and the Robust Internet-of-Things (RIoT), a cryptographic key can be generated, at boot time, based on a combination of the unique device secret (UDS) and other non-secret data stored in the secure memory device. The cryptographic key can then be used as a secret and an identity of the memory device.

During the manufacture of the memory device in the secure facility, the unique device secret (UDS) of the memory device is registered in the key management server. Subsequently, after the memory device is shipped from the manufacturer of memory devices, the unique device secret (UDS) is not exported, provided, communicated by the memory device outside of a secure section of the memory device and/or not outside of the memory device. Since the unique device secret (UDS) is known between the memory device and the key management server, both the memory device 130 and the key management server can perform the same computations that use the unique device secret (UDS) to generate a cryptographic key. The cryptographic key derived based at least in part on the unique device secret (UDS) for the authentication of the memory device.

For example, authentication of the memory device can be performed through the verification that the memory device has the cryptographic key and thus the unique device secret and stores an untampered version of non-secret data. The memory device can digitally sign a certificate or message using the cryptographic key. If it can be verified that the digital signature has been created using the cryptographic key, the memory device is seen to be in possession of the cryptographic key and thus have the identity representative of and associated with the unique device secret.

Digital authentication of a message can be achieved by applying cryptographic functions to the message and using a cryptographic key. For example, symmetric cryptography and/or asymmetric cryptography can rely on hashes as the content that is signed digitally using the cryptographic key. For example, the signing using symmetric cryptography can be performed by creating a Message Authentication Code (MAC) (e.g., a Hash-Based Message Authentication Code (HMAC) or a Cipher-based Message Authentication Code (CMAC)). For example, the signing using asymmetric cryptography can be performed by creating a digital signature (e.g., using Digital Signature Algorithm (DSA) or Elliptic Curve Digital Signature Algorithm (ECDSA)). Cryptographic functions can include hashing and encryption, which are typically used to generate a header added to the message for authentication. The header can be a hash digest, when using symmetric cryptography, or a digital signature when applying asymmetric cryptography. The recipient of the message can then apply similar cryptographic functions to the received message and use a cryptographic key to authenticate that the message's content was sent by a trusted party, owning the appropriate cryptographic key. For example, the encrypted hash value in the header can be decrypted for comparison with a hash value calculated independently from the message. If there is a match between the hash value calculated from the message and the hash value recovered from decrypting the header (e.g., the digital signature and/or the hash digest), the integrity of the message can be confirmed in view of the hash value; and the header can be seen to have been created using the cryptographic key.

Cryptographic keys generated at boot time can be used to sign certificates at boot time and immediately discarded to safeguard their secrecy. Alternatively, keys generated at boot time can be kept in memory to be used later at runtime. In some cases, the cryptographic keys used at boot time are referred to as DICE device ID keys and the keys used at runtime are referred to as DICE alias keys. In some cases, the device ID private key can be used to sign a certificate including the alias public key to attest that the alias key was generated from the memory device.

In some arrangements, at least some of the security features of a memory device is initially deactivated when the memory device is shipped from a facility manufacturing memory devices to an Original Equipment Manufacturer (OEM) of a computing device in which memory devices are installed. A command can be provided to the memory device to activate the inactive security features.

The privilege of having the command to be accepted by a memory device for execution can be associated with a cryptographic key. When the memory device verifies that the command is digitally signed via the correct cryptographic key, the memory device executes the command; otherwise, the memory device can reject or ignore the command. Various commands to activate or deactivate security features, or to read, write, update, delete, and/or modify a secure section of memory cells can be configured to require privileges based on relevant cryptographic keys.

For example, a memory device is configured to store a cryptographic key for the verification of the privilege of an entity in requesting the memory device to execute a command. The privilege can be verified by checking, using the cryptographic key, whether the command is signed by using a corresponding cryptographic key. When symmetric cryptography is used, the command is to be signed using the same cryptographic key stored in the memory device for verification of the privilege. When asymmetric cryptography is used, the command is to be signed using a private key associated with the public key stored in the memory device for verification of the privilege.

At least some privileges to operate a memory device can be initially provided to the manufacturer of the memory device. For example, the memory device can be manufactured to store a public key of the manufacturer to allow privilege to be checked by the memory device through validation of a digital signature applied on a command using a corresponding private key of the manufacturer. Alternatively, when symmetric cryptography is used, the memory device is manufactured to store a secret cryptographic key known to the memory device and the manufacturer for digital signature validation.

A privilege can be transferred from the manufacturer of the memory device to another entity, such as a manufacturer of a computing device in which the memory device is installed. The transfer can be accomplished by replacing the corresponding cryptographic key stored in the memory device, or by providing the secret key usable to sign the command.

The access control server can use the services of the key management server to securely verify the identity of the memory device, to sign commands that requires privileges, and/or to transfer privileges.

For example, a set of privileges can be assigned to an entity considered as the owner of a memory device. The owner privileges can be verified via a cryptographic key stored within the memory device. Examples of such privileges can be required for activating security features of the memory device, updating an identity of the memory device (e.g., based on updated non-secure data stored in the memory device), and transferring the owner privileges to another entity, such as the manufacturer of a computing device in which the memory device is installed. A current owner of the memory device may digitally sign the privileged commands to request their execution in the memory device.

Ownership privileges can be further required for deactivating selected security features, managing cryptographic key in the memory device to authenticate users authorized to use one or more secure sections in the memory device, and/or managing the identity of the memory device and/or the computing device generated based at least in part on the unique device secret of the memory device.

FIG. 1 shows a server system 102 configured to control memory devices according to one embodiment. The server system 102 includes a key management server 103 and an access control server 101.

In FIG. 1, the key management server 103 is configured to store data associating cryptographic keys 124 with unique identifications 122.

For example, the cryptographic keys 124 can be configured for the operations of a security manager 113 of a memory device 130. The security manager 113 can have a unique device secret (UDS) that is registered into the key management server 103 during the manufacture of the memory device 130 in a secure facility. A cryptographic operation demonstrating that the memory device 130 is in possession of the unique device secret (UDS) can be viewed as validation that the memory device 130 is authentic.

The cryptographic keys 124 stored in the key management server 103 for the memory device 130 can include the unique device secret (UDS). Further, the cryptographic keys 124 can include data that can be combined with the unique device secret (UDS) to generate derived cryptographic keys 124. Such data used to generate derived cryptographic keys 124 can include non-secret data, such as the hash value obtained from applying a cryptographic hash function to a set of data and/or instructions stored, or to be stored, in the memory device 130. The cryptographic keys 124 can include derived cryptographic keys 124 that are generated using the unique device secret (UDS) and the non-secret data. The memory device 130 and the key management server 103 are configured to generate the same derived cryptographic keys 124 based on the unique device secret (UDS) and other data (e.g., the non-secret data). Since the memory device 130 and the key management server 103 can independently generate the same derived keys, no communication of the unique device secret (UDS) outside of the memory device 130 and the key management server 103 is performed for the authentication of the identity of the memory device 130. Such an arrangement improves security.

The memory device 130 can demonstrate that it is in possession of the unique device secret (UDS), known to the key management server 103, by showing that it has a secret cryptographic key 124 that is derived based at least in part on the unique device secret (UDS) of the memory device 130. For example, the secret cryptographic key can be used to generate a digital signature applied on a message; and the key management server 103 can use a corresponding key to verify that the digital signature is applied using the secret cryptographic key derived from the unique device secret (UDS) of the memory device 130. The corresponding key can be the same secret cryptographic key 124 using symmetric cryptography, or a public key corresponding to the secret, private key using asymmetric cryptography. The digital signature can be in the form of a Hash-based Message Authentication Code (HMAC), or in the form of an encrypted hash of the message being signed.

In general, a secret key can be a symmetric cryptographic key used in symmetric cryptography where both encryption and decryption are configured to use the same key. Alternatively, the secret key can be one of a pair of keys used in asymmetric cryptography where encryption performed using one key is to be decrypted using the other key but not decryptable using the same key that used in encryption; and it is generally impractical to determine one key from the other key in the pair. Thus, one of the key pair can be used as a secret and thus a private key; and the other key can be revealed as a public key. Using the public key, an entity does not have the private key can verify whether the cipher text is generated using the corresponding private key.

The memory device 130 can include an unique identification (UID) 122 that uniquely identify the memory device 130 from other memory devices in a population. For example, the unique identification (UID) 122 of the memory device 130 can include a manufacturer part number (MPN) of the memory device 130 and/or a serial number of the memory device 130. For example, the unique identification (UID) 122 of the memory device 130 can include a public key in a pair of asymmetric cryptographic keys generated based at least in part on the unique device secret.

After the memory device 130 is connected to a client computer system 105, the client computer system 105 may initiate one or more operations that rely upon the cryptographic keys 124 that is stored in the key management server 103 in association with the unique identification (UID) 122 of the memory device 130.

For example, the client computer system 105 may request the verification of the identity of the memory device 130 as represented by a unique device secret (UDS) or a secret key of the memory device 130. The client computer system 105 can request the memory device 130 to provide identity data that includes the unique identification (UID) 122 of the memory device 130, and a digital signature applied on a message included in the identity data using a secret key of the memory device 130. For example, the message can include the unique identification (UID) 122, a cryptographic nonce, and a counter value. The identity data can be transmitted to the key management server 103 for authentication using a corresponding cryptographic key 124 associated with the unique identification (UID) 122 of the memory device 130.

In the system of FIG. 1, the access control server 101 is configured between the client computer system 105 and the key management server 103. The access control server 101 stores client privilege data 127 and memory device permission data 129.

For example, the client privilege data 127 can include a whitelist of the Internet Protocol (IP) addresses of client computer systems (e.g., 105, . . . , 106) that are allowed to access the functionality of the key management server 103. When a computer system that is not on the whitelist sends a request to the access control server 101, the access control server 101 can drop or ignore the request. The access control server 101 can be configured to prevent deny of service (DoS) attacks on the key management server 103.

FIG. 1 illustrates the use of one access control server 101 that is configured to allow a set of client computer systems (e.g., 105, . . . , 106) to use the functionality of the key management server 103. In general, a plurality of access control servers 101 can be configured to allow different sets of client computer systems to access the key management server 103. In some implementations, a client computer system 105 can use one or more of the multiple access control servers (e.g., 101) to access the functionality of the key management server 103.

The access control server 101 and the client computer system 105 can establish a secure authenticated connection 201 over a non-secure communication media, such as the Internet. For example, the access control server 101 is configured to authenticate the identity of the client computer system 105 based on a certificate 121 of the client computer system 105; and the client computer system 105 is configured to authenticate the identity of the access control server 101 based on a certificate 123 of the access control server 101. For example, a public key of the access control server 101 can be used by the client computer system 105 to verify that the access control server 101 is in possession of the private key associated with the public key; and a public key of the client computer system 105 can be used by the access control server 101 to verify that the client computer system 105 is in possession of the private key associated with the public key. The client computer system 105 and the access control server 101 can negotiate a session key for the encryption of the messages transmitted between the client computer system 105 and the access control server 101 during a communication session.

The memory device permission data 129 stored in the access control system 101 indicates whether the client computer system 105 has legitimate reasons to access the key management server 103 for the memory device 130 identified by its unique identification (UID) 122. Optionally, the permission data 129 indicates whether the client computer system 105 has legitimate reasons to access the key management server 103 for one or more memory devices (e.g., 130) without specifically and/or individually identifying the respective memory devices (e.g., 130) by their unique identifications. In some implementations, the permission data 129 indicates whether the client computer system 105 has legitimate reasons to access the key management server 103 for a specific batch or group of memory devices (e.g., 130) identified using a batch or group identification.

For example, if the memory device 130 is purchased by an entity operating the client computer system 105, the memory device permission data 129 indicates that the ownership privileges in operating the memory device 130 can be transferred to the entity via the client computer system 105. Thus, a request to operate on the memory device 130 can be accepted and serviced using the functionality of the key management server 103. For example, such a request can be made to verify the authenticity of the memory device 130, to activate security features of the memory device 130, to replace and/or install some of the cryptographic keys 124 in the memory device 130, to access a secure portion of memory cells 107 of the memory device 130, etc. However, if the unique identification (UID) 122 of the memory device 130 is not associated with the client computer system 105 in the memory device permission data 129, the request can be dropped or rejected.

In some implementations, the key management server 103 and the access control server 101 may also communicate over a non-secure communication media, such as the Internet. The key management server 103 and the access control server 101 can establish secure authenticated connection 203 using their respective certificates (e.g., 123 and 125).

Optionally, the key management server 103 and the access control server 101 can be connected using dedicated communication connections and/or configured for improved security within an intranet.

The access control server 101 can request the key management server 103 to determine whether a digital signature from the memory device 130 is signed using a cryptographic key 124 derived from a unique device secret of the UID 122 of the memory device 130.

Optionally, the access control server 101 can request the key management server 103 to generate a digital signature on a message or command.

For example, the key management server 103 can store a private key representative of a current holder of a privilege to operate the memory device 130; and after verifying that the memory device 130 is authentic and the client computer system 105 is eligible to request the transfer of the privilege, the access control server 101 can request the key management server 103 to sign a command using the private key representative of the current holder of the privilege, such as a privilege to configure security operations of the memory device 130. The command can be configured to change or replace a portion of data used in the memory device 130 to generate identity data of the memory device 130, to change or update a public key of a holder of a privilege, to add or change a public key of an authorized user to perform a restricted operations in a section of the memory cells 107. Examples of restricted operations include reading, writing, erasing, and/or updating data in a section of memory cells 107 in the memory device 130.

The memory device 130 can be used as a storage device and/or a memory module of a host system. Examples of storage devices and memory modules are described below in conjunction with FIG. 2. In general, a host system can utilize a memory sub-system that includes one or more components, such as memory devices 130 that store data. The host system can provide data to be stored at the memory sub-system and can request data to be retrieved from the memory sub-system.

Figure 2:
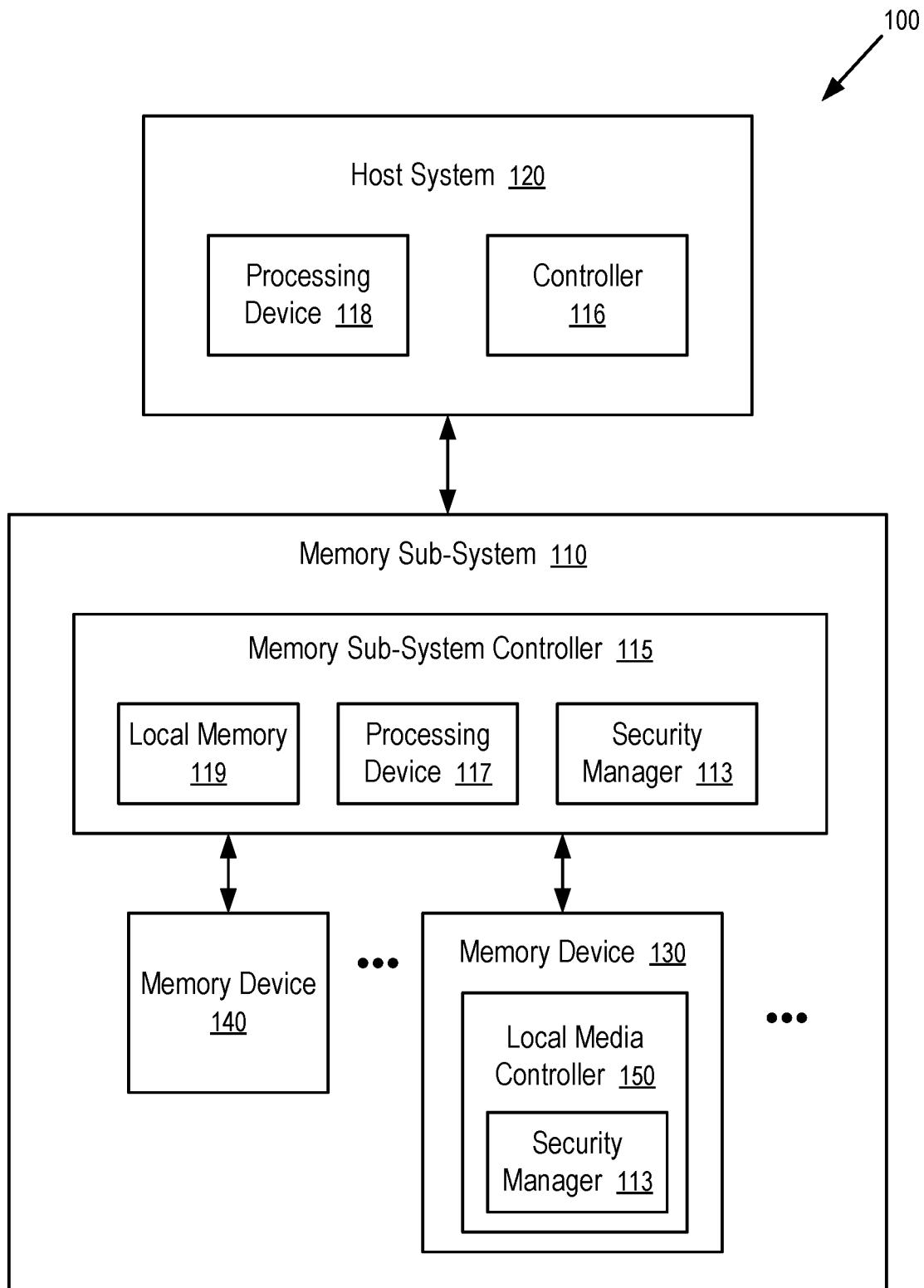
FIG. 2 illustrates an example computing system having a memory sub-system in accordance with some embodiments of the present disclosure.

FIG. 2 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such a computing device that includes memory and a processing device.

Figure 3:
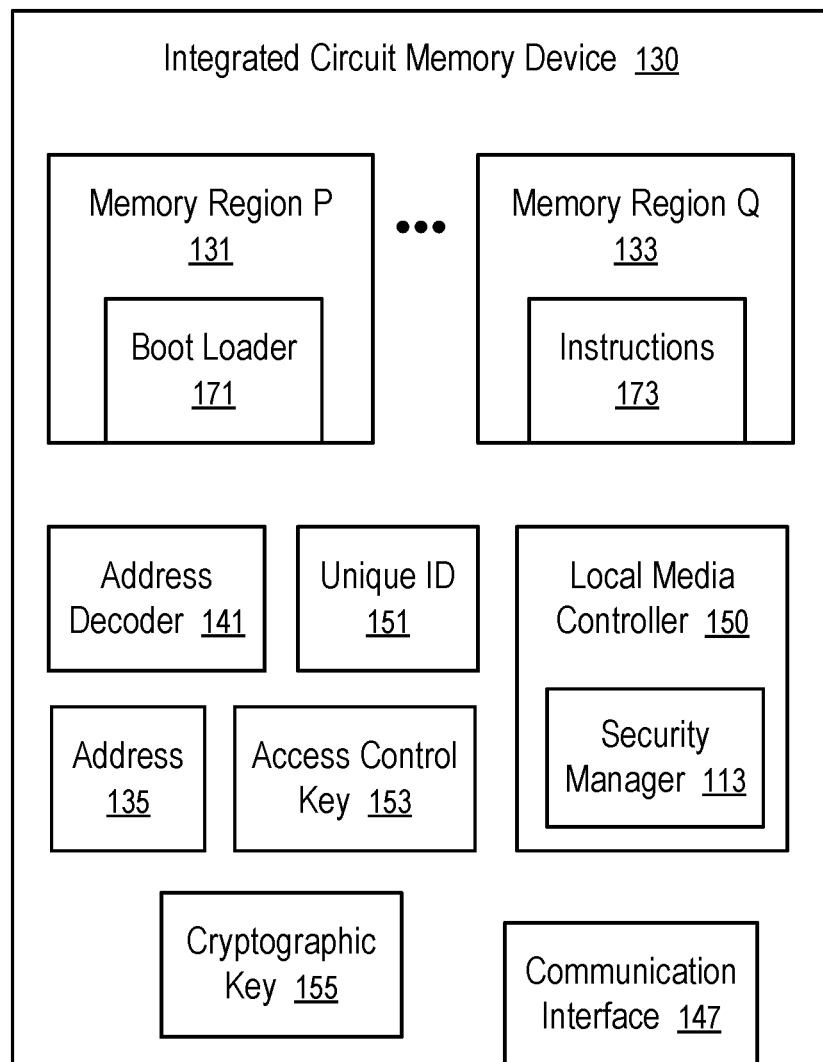
FIG. 3 illustrates an integrated circuit memory device having a security manager according to one embodiment.

The computing system 100 can include a host system 120 that is coupled to one or more memory sub-systems 110. FIG. 3 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset (e.g., processing device 118) and a software stack executed by the processor chipset. The processor chipset can include one or more cores, one or more caches, a memory controller (e.g., controller 116) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 2 illustrates a memory sub-system 110 as an example. In general, the host system 120 can access multiple memory sub-systems via a same communication connection, multiple separate communication connections, and/or a combination of communication connections.

The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110. In general, the controller 116 can send commands or requests to the memory sub-system 110 for desired access to memory devices 130, 140. The controller 116 can further include interface circuitry to communicate with the memory sub-system 110. The interface circuitry can convert responses received from memory sub-system 110 into information for the host system 120.

The controller 116 of the host system 120 can communicate with controller 115 of the memory sub-system 110 to perform operations such as reading data, writing data, or erasing data at the memory devices 130, 140 and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits (ICs) and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory devices 130, 140 can include any combination of the different types of non-volatile memory components and/or volatile memory components. The volatile memory devices (e.g., memory device 140) can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations (e.g., in response to commands scheduled on a command bus by controller 116). The controller 115 can include hardware such as one or more integrated circuits (ICs) and/or discrete components, a buffer memory, or a combination thereof. The hardware can include digital circuitry with dedicated (e.g., hard-coded) logic to perform the operations described herein. The controller 115 can be a microcontroller, special purpose logic circuitry (e.g., a field programmable gate array (FPGA), an application specific integrated circuit (ASIC), etc.), or another suitable processor.

The controller 115 can include a processing device 117 (e.g., processor) configured to execute instructions stored in a local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 2 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory devices 130. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 150 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 150) for media management within the same memory device package. An example of a managed memory device is a managed NAND (MNAND) device.

The controller 115 and/or a memory device 130 can include a security manager 113 configured to control access to the memory cells 107 in the memory device 130. In some embodiments, the controller 115 and/or the local media controller 150 in the memory sub-system 110 can include at least a portion of the security manager 113. In other embodiments, or in combination, the controller 116 and/or the processing device 118 in the host system 120 can include at least a portion of the security manager 113. For example, the controller 115, the controller 116, and/or the processing device 118 can include logic circuitry implementing the security manager 113. For example, the controller 115, or the processing device 118 (e.g., processor) of the host system 120, can be configured to execute instructions stored in memory for performing the operations of the security manager 113 described herein. In some embodiments, the security manager 113 is implemented in an integrated circuit chip disposed in the memory sub-system 110. In other embodiments, the security manager 113 can be part of firmware of the memory sub-system 110, an operating system of the host system 120, a device driver, or an application, or any combination therein.

For example, when the memory device 130 is initially shipped from a manufacturer of memory devices, the memory device 130 is configured with a cryptographic key of the manufacturer to provide the manufacturer with privileges to configure the security operations of the memory device 130. To facilitate the assembling of the computing system 100 of FIG. 2 in which the memory device 130 is installed, the privileges can be provided to or transferred to the manufacturer of the computing system 100. The transfer can include the activation of security features of the memory device 130 via the access control server 101, after authenticating the identity of the memory device 130. Optionally, the privileges can be transferred to the manufacturer of the computing system 100 by replacing the cryptographic key controlling the privileges to configure the security operations of the memory device 130. After the activation, the security manager 113 can control software/firmware installed in the memory device 130 to operate the computing system 100, and generate identity data representative not only the memory device 130, but also the computing system 100 having the memory device 130 and other software/hardware components.

The security manager 113 can build an identity of the memory device 130 based on not only its unique device secret (UDS), but also instructions stored in the memory device 130 for execution by the processing device 118 of the host system 120. For example, the security manager 113 can determine a cryptographic hash value of a set of instructions to be executed during boot time of the computing system 100. The security manager 113 can check the integrity of the set of instructions by comparing the hash value computed at the boot time with a pre-calculated hash value. If the two hash value agrees with each other, the set of instructions can be considered to have not been tampered with and/or corrupted. Thus, the set of instructions can be executed in the computing system 100 to further implement the security operations of the security manager 113 and/or the boot operations of the computing system 100. Optionally, the verification of the hash value can be part of the authentication of the computing system 100 as an endpoint using a certificate generated through the execution of at least a portion of the set of instructions during the boot time of the computing system 100.

For example, an identifier of the memory device 130 can be generated based at least in part on the hash value of the set of instructions. Thus, when the identifier of the memory device 130 is verified through the authentication using the certificate, the hash value of the set of instructions can be considered to have been verified as correct, and the set of instructions used to generate the certificate and to boot up the computing system 100 has not been tampered with and/or corrupted.

The execution of the set of instructions in the computing system 100 causes the computing system 100 to determine the identifies of other components of the computing system 100, such as an identifier of the processing device 118, an identifier of the controller 116, an identifier of the memory sub-system controller 115, an identifier of the memory device 140, and/or an identifier of a software program (e.g., an operating system, a device driver, an application program, etc.). The set of identifiers of the components in the computing system 100 having the memory device 130, including the identifier of the memory device 130, can be combined to generate a cryptographic key for the signing of a certificate. The certificate is based on a monotonically increasing counter value that increases every time the computing system 100 is booted up and/or every time the memory device 130 performs a secure operation. Optionally, the certificate can show some of the identifiers used to generate the cryptographic key used to sign the certificate. The certificate may also include a DICE alias public key generated at boot time.

The certificate can be communicated to a remote computer (e.g., access control server 101) over a computer network for authentication. When the certificate is authenticated, it can be concluded that the integrity of the set of instructions used to generate the certificate is intact, and the computing system 100 has the memory device 130 in combination with the set of components represented by the identifiers used to generate the cryptographic key that is used to sign the certificate. Additionally, the monotonic counter value included in the certificate allows its recipient to verify that it was generated recently, and thus that it can be trusted. The certificate holds a DICE alias public key, which can be compared with the DICE alias public key (e.g., stored on the remote computer, or computed just in time for its use in response to the certificate). If the two keys match, then the remote computer can trust further messages sent by the endpoint and signed with the DICE alias private key.

FIG. 3 illustrates an integrated circuit memory device having a security manager according to one embodiment. For example, the memory device 130 in the memory sub-system 110 of FIG. 2 and/or the memory device 130 connected to the client computer system 105 in FIG. 1 can be implemented using the integrated circuit memory device 130 of FIG. 3.

The integrated circuit memory device 130 can be enclosed in a single integrated circuit package. The integrated circuit memory device 130 includes multiple memory regions 131, . . . , 133 that can be formed in one or more integrated circuit dies. A typical memory cell in a memory region 131, . . . , 133 can be programmed to store one or more bits of data.

The local media controller 150 can include at least a portion of a security manager 113 that is configured to control access to at least one of the memory regions 131, . . . , 133.

For example, the security manager 113 can use an access control key 153 to implement the privilege of a type of operations. When a request for an operation of such a type is received in the integrated circuit memory device 130, the security manager 113 can use the access control key 153 to verify whether the request is digitally signed using a corresponding cryptographic key. For example, the requester may digitally sign the request, or a challenge message, using a cryptographic key such that the digital signature can be verified using the access control key 153. The requested operation is performed by the memory device 130 when the digital signature verification performed using the access control key 153 is successful. Otherwise, the request can be rejected or ignored.

For example, the privilege can be the permission to write data in a memory region (e.g., 131) to prevent tampering of the data stored in the memory region, such as a boot loader 171 of the computing system 100, firmware/software/operating system of the computing system 100, security setting of the memory device 130, etc.

The memory device 130 can have a unique identification 151 that identifies the memory device 130 and a secret cryptographic key 155 that demonstrates the authenticity of the memory device 130 having the unique identification 151. For example, the cryptographic key 155 can be generated from a unique device secret (UDS) of the memory device 130 and other data, such as information of the non-secret data stored in a memory region (e.g., 131) and/or information of other components of the computing system 100.

The integrated circuit memory device 130 has a communication interface 147 to receive a command having an address 135 from the controller 115 of a memory sub-system 110. In response to the address 135 identifying a memory region 131 that requires access control, the security manager 113 performs cryptographic operations, using the access control key 153, to verify that the request is from a requester having a corresponding cryptographic key that represents authorization for the access. After the verification of the authorization, permission, or privilege for the access, the memory device 130 can provide memory data retrieved from the memory region 131 using an address decoder 141. The address decoder 141 of the integrated circuit memory device 130 converts the address 135 into control signals to select a group of memory cells in the integrated circuit memory device 130; and a local media controller 150 of the integrated circuit memory device 130 performs operations to determine the memory data stored in the memory cells at the address 135.

The memory region 131 can store a boot loader 171. At boot time, the security manager 113 can measure the boot loader 171 by computing a cryptographic hash value of the boot loader 171. The cryptographic hash value of the boot loader 171 can be used to generate identity data of the integrated circuit memory device 130 and/or the computing system 100. The boot loader 171 (and/or an operating system or a device driver, or a security application) can include instructions to implement a portion of the security manager 113. During the boot time, the instructions can determine the configuration of the computing system 100 in which the integrated circuit memory device 130 is a component.

For example, the configuration of the computing system 100 of FIG. 2 can include the software/firmware components of the memory sub-system 110. The software/firmware can be stored in other memory devices (e.g., 140), or in the memory device 130 in a memory region 133. For example, the instructions 173 in the memory region 133 in the integrated circuit memory device 130 can include the operating system of the computing system 100, device drivers, firmware, and/or software applications. Some of the major software/firmware components of the memory sub-system 110 can be stored outside of the memory region(s) under the access control of the security manager 113 and/or outside of the integrated circuit memory device 130. The identifiers of the software/firmware components can include component identifications, version numbers, serial numbers, and/or cryptographic hash values of the software/firmware components.

The configuration of the computing system 100 of FIG. 2 can include the hardware components of the memory sub-system 110, such as the processing device 118 and/or the controller 116. The host system 120 can further include peripheral devices, such as a network interface card, a communication device, another memory sub-system, etc. The identifiers of the hardware components can include serial numbers, addresses, identification numbers, etc.

The configuration information of the computing system 100, including the unique identification 151 can be used to generate a secret cryptographic key 155 to sign a certificate generated using at least the value from a monotonic counter. The certificate identifies the counter value, the unique identification 151 of the memory device 130, and/or an unique identification of the computing system 100 in which the memory device 130 is installed.

The key management server 103 can be used to validate the authenticity of the certificate, since the key management server 103 has the unique device secret (UDS) and can generate the same cryptographic keys (e.g., 155) generated by the memory device 130 without requiring the communication of a secret over a communication channel, after the memory device 130 is manufactured.

In one embodiment of a method to control a memory device, a first computer system (e.g., access control server 101) establishes, with a client computer system 105, a secure authenticated connection 201.

For example, to establish the secure authenticated connection 201, the access control server 101 receives a first certificate 121 from the client computer system 105. The first certificate 121 indicates an identity of the client computer system 105; and the access control server 101 validates the first certificate 121. For example, the access control server 101 can store a public key of the client computer system 105 and use the public key to validate the first certificate 121 is signed using a private key corresponding to the public key.

Similarly, to establish the secure authenticated connection 201, the access control server 101 provides a second certificate 123 to indicate an identity of the access control server 101. The client computer system 105 is configured to validate the second certificate 123 prior to the establishing of the secure authenticated connection 201.

The establishing of the secure authenticated connection 201 can include establishing a session key to encrypt data transmitted via the secure authenticated connection 201.

To reduce the impact of deny of service (DoS) attacks on the performance of the access control server 101, the access control server 101 can store a list of Internet Protocol (IP) addresses of client computer systems (e.g., 105, . . . , 106). The access control server 101 can determine whether to establish the secure authenticated connection 201 based at least in part on whether an address of the client computer system 105 is in the list.

The first computer system (e.g., access control server 101) receives, over the connection 201 from the client computer system 105, a request about a memory device 130.

The request can include identity data of the memory device 130.

The first computer system (e.g., access control server 101) determines, based on data stored in the first computer system, that the client computer system 105 is eligible to operate the memory device 130.

For example, the data can include client privilege data 127 indicating that the operator of the client computer system 105 is a new owner of the memory device 130. In one implementation, data is stored to associate unique identifications (e.g., 122) of memory devices (e.g., 130) with the client privilege data 127 for the client computer system 105 that is eligible to control the memory devices (e.g., 130) as the owner or manufacturer of endpoints in which the memory devices (e.g., 130) are installed. Additional client-specific data is stored for logging, reporting and invoice generation at the time of key retrieval from the key management server 103 to facilitate the transfer of owner privileges and/or other privileges. The separation of the access control data and invoice generation data allows the use of the access control server 101 to retrieve, from the key management server 103, cryptographic keys representative privileges to operate the memory devices (e.g., 130), without requiring that the access control server 101 to have any personally identifiable information regarding the customer requesting the cryptographic keys or the client computer system making the request. Thus, an arrangement can provide client partner anonymity in the requests being made via the access control server 101 while still ensuring that only the client computer system 105 with the correct certificate will be allowed access.

For example, the data can include memory device permission data 129 indicating whether an operator of the client computer system 105 has purchased the privilege to use a security feature of the memory device 130.

In response to a determination that the client computer system 105 is eligible to operate or control the memory device 130, the first computer system (e.g., access control server 101) communicates with a second computer system (e.g., key management server 103) to generate a response to the request. The response is generated using at least a cryptographic key 124 stored in the second computer system (e.g., key management server 103) in association with an unique identification 122 of the memory device 130. The response is generated via the second computer system (e.g., key management server 103) performing operations using the cryptographic key 124 without transmitting the cryptographic key 124 outside of the second computer system (e.g., key management server 103). For example, the key management server 103 can have a hardware security module (HSM) to ensure security of the cryptographic key 124 in its storage and usage in the key management server 103. Since the cryptographic key 124 is not provided to the access control server 101, a hardware security module (HSM) is not necessary in the access control server 101 for the security of the cryptographic key 124. Alternatively, the access control server 101 and the key management server 103 can be implemented in a same computer system.

For example, the request received from the client computer system 105 can include identity data of the memory device 130; and the response can include an indication of whether the memory device 130 is authentic according to the cryptographic key 124.

For example, the cryptographic key 124 can be a secret key generated, independently and separately by the second computer system (e.g., key management server 103) and by the memory device 130, based on an unique device secret of the memory device 130. The unique device secret of the memory device 130 is registered and stored in the second computer system (e.g., key management server 103) during manufacture of the memory device 130. Subsequently, the unique device secret of the memory device 130 is kept as secret within the memory device 130 and within the key management server 103 respectively and not communicated/revealed to outside of the memory device 130 and the key management server 103 for improved security.

Optionally, the first computer system (e.g., access control server 101) communicates with the second computer system (e.g., key management server 103) to establish a separate secure authenticated connection 203 between them to generate the response. For example, the access control server 101 can request the key management server 103 to determine whether the identity data of the memory device 130 is derived from the unique device secret of the memory device 130 through cryptographic computation.

For example, the response can include a command executable in the memory device 130 to transfer a privilege to an operator of the client computer system 106, and/or to activate at least one security feature of the memory device 130. For example, the command includes a digital signature applied on the command using a cryptographic key of a current holder of the privilege; and the command is executable in the memory device 130 after the digital signature is validated by the memory device 130.

For example, the response can include a cryptographic key usable to apply a digital signature on a command such that the command can be executed by the memory device 130 upon validation of the digital signature in the memory device 130. When the command does not have a valid digital signature, the memory device 130 can reject or ignore the command.

The server system 102 discussed above can be used to provide privileges to the client computer system 105 to control security aspects of the memory device 130 without exposing the secret cryptographic key 124 in clear text outside of the memory device 130 and the key management server 103 and without trusting the client computer system 105 in securing the secret cryptographic key 124.

Figure 4:
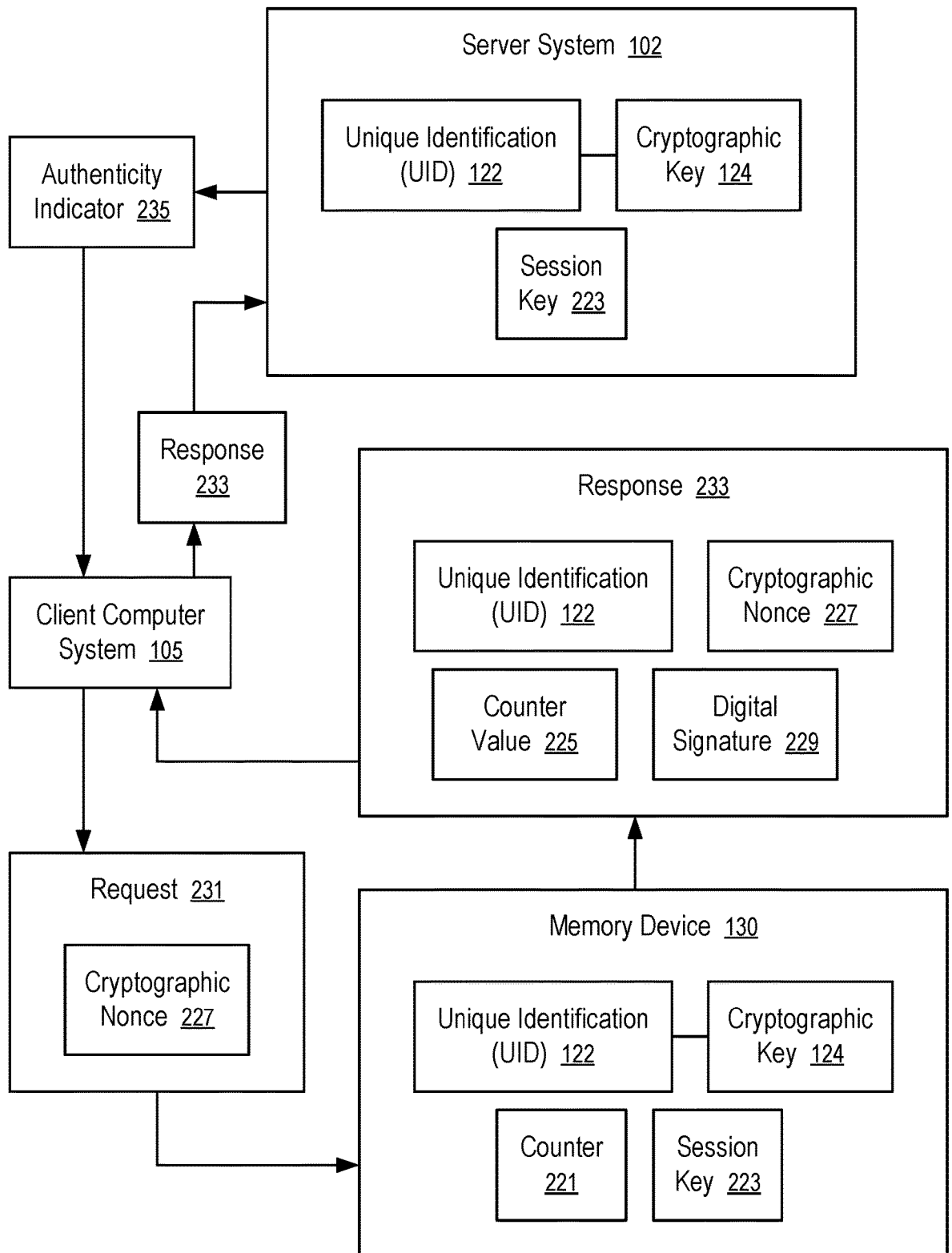
FIG. 4 illustrates a technique to authenticate a memory device according to one embodiment.

FIG. 4 illustrates a technique to authenticate a memory device according to one embodiment. For example, through the authentication operations, a session key can be established to secure communications between a key management server 103 and a memory device 130 without trusting the client computer system 105 in handling the security to protect the secret of the memory device 130.

In FIG. 4, the client computer system 105 can send to the memory device 130 a request 231 for identity data of the memory device 130.

The request 231 can include a cryptographic nonce 227. For example, the cryptographic nonce 227 can be generated by the server system 102 in response to a request from the client computer system 105, or generated by the client computer system 105 and shared with the server system 102 for the request 231. Alternatively, the memory device 130 may generate the cryptographic nonce 227 in response to the request 231 and provide a corresponding response 233 that includes the cryptographic nonce 227.

In response to the request 231 for identity data of the memory device 130, the memory device 130 provides a response 233 that includes a message identifying the unique identification (UID) 122 of the memory device 130.

A digital signature 229 is applied to the message provided in the response using the secret cryptographic key 124 of the memory device 130. Having the secret cryptographic key 124 is evidence that the memory device 130 is authentic. For example, the digital signature 229 can include a Hash-based Message Authentication Code (HMAC) generated using the message included in the response 233 and the cryptographic key 124. For example, the cryptographic key 124 can be used to generate two keys for the generation of the Hash-based Message Authentication Code (HMAC). After combining one of the two keys with the message to generate a message modified by the key, the memory device 130 can apply a cryptographic hash function to the key-modified message to generate a hash value, combine the other key with the hash value to generate a further message, and apply the cryptographic hash function (or another cryptographic hash function) to the further message to generate the Hash-based Message Authentication Code (HMAC). Alternatively, the digital signature 229 can be generated using other techniques based on a cryptographic hash function and the encryption performed using the cryptographic key 124, where the encryption can use symmetric cryptography or asymmetric cryptography in general.

To protect the response 233 and/or the digital signature 229 from security attacks (e.g., reuse of the response 233 and/or attempts to recover the secret cryptographic key 124), the digital signature 229 is generated on a message that includes the unique identification (UID) 122, a counter value 225, and the cryptographic nonce 227. The counter value 225 is obtained from a counter 221 in the memory device 130. The value of the counter 221 increases monotonically. For example, the counter 221 can be used to store a value representative of a count of requests received for identity data and/or other data items or operations related to security. Thus, a response containing a counter value 225 that is lower than a previously-seen counter value can be considered invalid. The cryptographic nonce 227 is used in the generation of the response 233 once and discarded by the memory device 130. When the cryptographic nonce 227 has been previously provided to, or generated by, the server system 102, the response 233 does not have to explicitly include the cryptographic nonce 227 in the response 233.

The client computer system 105 forwards the response 233 to the server system 102 to request the authentication of the memory device 130. Using the unique identification 122 provided in the response 233, the server system 102 can locate the secret cryptographic key 124 (or a corresponding public key when asymmetric cryptography is used) associated with the unique identification 122 in the key management server 103. The digital signature 229 can be validated using the cryptographic key 124 (or the corresponding public key when asymmetric cryptography is used).

For example, the server system 102 can independent compute the Hash-based Message Authentication Code (HMAC) applied to the message contained in the response 233 and compare the computed result with the corresponding result provided in the digital signature 229. If the results are the same, the server system 102 can conclude that the memory device 130 has the secret cryptographic key 124 and thus the memory device 130 is authentic. Otherwise, the memory device 130 is not authentic.

Based on the validation of the digital signature 229, the server system 102 provides an authenticity indicator 235 to the client computer 105. The authenticity indicator 235 indicates whether the memory device 130 is authentic.

Through the authentication of the memory device 130, the memory device 130 and the server system 102 can establish a session key 223 for communication with each other in a subsequent communication session. The session can be limited by a time period of a predetermined length following the response 233 or the validation of the digital signature 229. After the time period, the session key 223 expires and thus can be destroyed or discarded. Further, a subsequent request for identity data can end the previous session started by the prior request for identity data.

The session key 223 can be generated based at least in part on a secret known between the server system 102 and the memory device 130 but not available to a communication channel between the server system 102 and the memory device 130.

For example, the session key 223 can be derived based at least in part on the secret cryptographic key 124. Further, the session key 223 can be based at least in part on the counter value 225 and/or the cryptographic nonce 227. Optionally, the session key 223 can be based at least in part on the digital signature 229. For example, the digital signature 229 and the cryptographic key 124 can be combined to generate the session key 223.

In some implementations, the session key 223 is independent from the digital signature 229; and the digital signature 229 can be generated using the session key 223 that is derived from the cryptographic key 124 (or another secret known between the server system 102 and the memory device 130).

Figure 5:
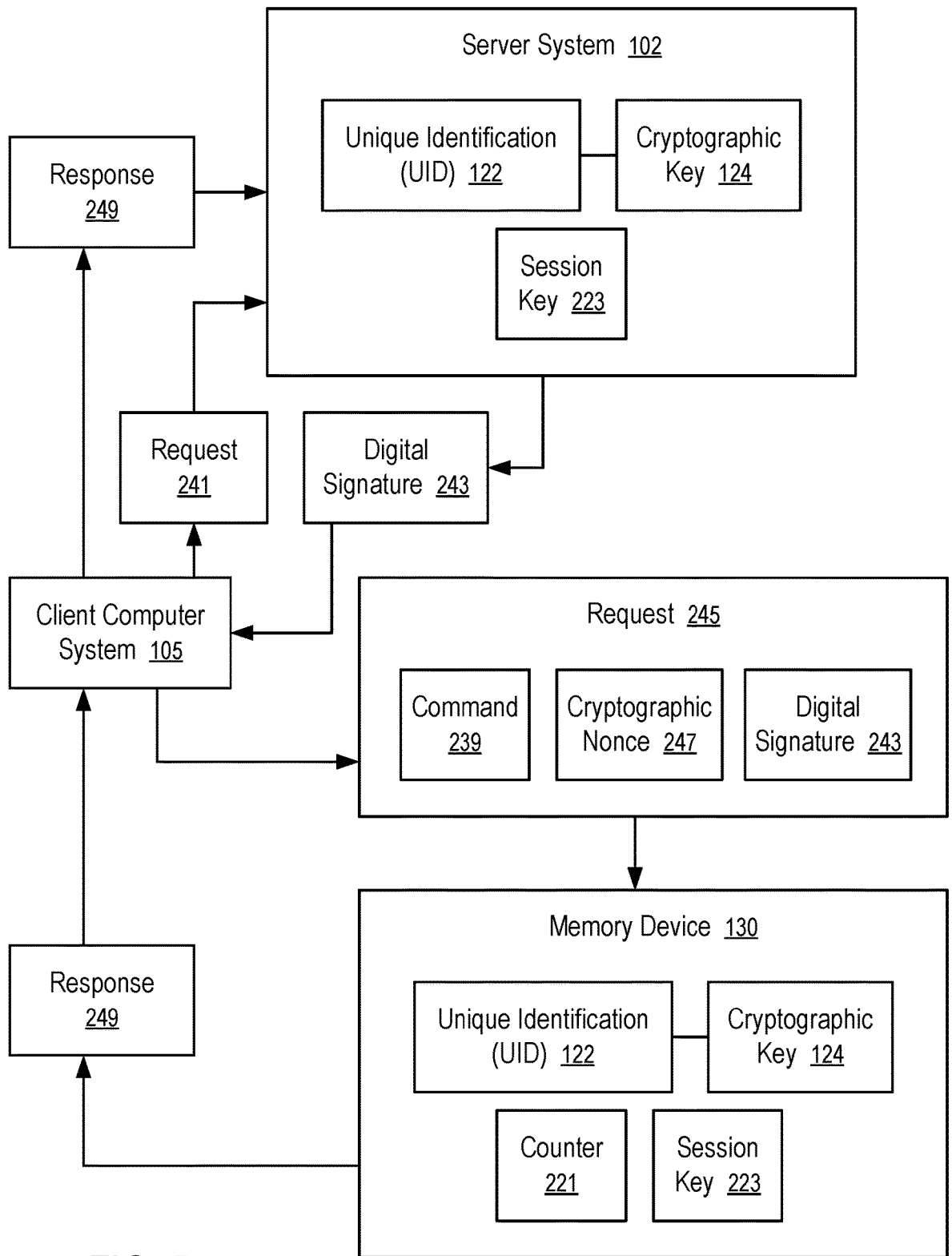
FIG. 5 illustrates a technique to generate a command to control security operations of a memory device according to one embodiment.

FIG. 5 illustrates a technique to generate a command to control security operations of a memory device according to one embodiment.

For example, after the privilege of the client computer system 105 to issue a command 239 to the memory device 130 is verified using the client privilege data 127 and the memory device permission data 129, the client computer system 105 can request the server system 102 to provide a digital signature 243 for the command 239.

After the client computer system 105 sends the request 241 that identifies the command 239 and the memory device 130, the server system 102 can generate a digital signature 243 for the command 239, if the client computer system 105 is determined to have the privilege to control or operate the memory device 130 using the command 239. The request 241 can include the unique identification 122 of the memory device 130 in which the command 239 is to be executed. For example, the unique identification 122 can be extracted by the client computer system 105 from the response 233 to the request 231 for identity data of the memory device 130 and/or the authenticity indicator 235 provided by the server system 102.

Similar to the digital signature 229 for the identity data, the digital signature 243 for the command 239 can include a Hash-based Message Authentication Code (HMAC) generated from a message to be provided to the memory device 130 in a request 245 and a key associated with the unique identification 122 of the memory device 130. The key can be the session key 223 as illustrated in FIG. 4, or the cryptographic key 124, or another secret key that is for the control of the execution of the command 239 in the memory device 130. When the digital signature 243 is based on the session key 223, the digital signature 243 expires when the session key 223 expires, which prevents the reuse of the digital signature 243 beyond the session in which the session key 223 is valid.

Alternatively, the digital signature 243 can be generated based on a cryptographic hash function and encryption performed using symmetric or asymmetric cryptography. For example, the digital signature 243 can be the cipher text of a hash value. The hash value is generated by applying a cryptographic hash function to the message; and the cipher text is generated by encrypting the hash value using the secret cryptographic key 124. When symmetric cryptography is used, the cipher text is to be decrypted using the same secret cryptographic key 124 for validation by the memory device 130 (or the cipher text is recreated independently by the memory device 130 from the hash value of the received message for validation). When asymmetric cryptography is used, the cipher text is to be decrypted using a public cryptographic key corresponding to the private cryptographic key 124 for validation by the memory device 130.

For example, the message provided in the request 245 can include the command 239 and a cryptographic nonce 247. The cryptographic nonce 247 is arranged for the command 239/request 245 and thus is different from the cryptographic nonce 227 for the transmission of the identity data of the memory device 130.

For example, in response to the request 241, the server system 102 can generate the cryptographic nonce 247 and used it in the generation of the digital signature 243. The cryptographic nonce 247 can be provided with the digital signature 243 for the client computer system 105 to generate the request 245. Alternatively, the client computer system 105 can generate the cryptographic nonce 247 and provided it to the server system 102 with the request 241. Alternatively, to generate the request 241, the client computer system 105 can request the cryptographic nonce 247 from the server system 102.

After the client computer system 105 sends the request 245 having the digital signature 243 obtained from the server system 102, the memory device 130 uses a corresponding key to validate the digital signature 243 for the message included in the request 245. If the digital signature 243 is valid, the memory device 130 executes the command 239; otherwise, the request 245 and/or the command 239 can be rejected or ignored.

For example, the command 239 can be configured to activate a security feature of the memory device 130.

For example, the command 239 can be configured to replace the cryptographic key 124 associated with the unique identification 122. For example, the new cryptographic key 124 can be generated using additional non-secret data provided during manufacture of a computing device in which the memory device 130 is installed but not available when the memory device 130 is being manufactured.

After the execution of the command 239, the memory device 130 provides a response 249 that can be forwarded by the client computer system 105 to the server system 102. The server system 102 can determine whether the response 249 is correct. For example, the memory device 130 can sign the response using the session key 223 for validation by the server system 102.

In some implementations, a replacement cryptographic key used to replace the key 124 is generated independently by the memory device 130 and by the server system 102 from a secret (e.g., a unique device secret) and additional data exchanged through the client computer system 105. The additional data can be protected through encryption performed using the session key 223.

In some implementations, a replacement cryptographic key 124 is communicated from the memory device 130 to the server system 102 in an encrypted form of cipher text generated using the session key 223.

In one embodiment of a method to control a memory device, a server system 102 establishes a secure authenticated connection 201 with a client computer system 105.

The server system 102 receives, over the connection 201 from the client computer system 105, a request identifying a memory device 130.

For example, the server system 102 receives, via the client computer system 105 from the memory device 130, identity data of the memory device 130. The server system 102 validates the identity data based on a secret of the memory device 130 stored in the server system 102. Based on validation of the identity data, a session key 223 is established and known between the server system 102 and the memory device 130.

For example, the identity data can include a second message and a second digital signature 229 applied on the second message using a secret cryptographic key 124 of the memory device 130. The second message can have an unique identification 122 of the memory device 130, a value 225 from a counter 221 configured in the memory device 130, and a second cryptographic nonce 227.

For example, the session key 223 can be configured to expire in a time period of a predetermined length from validation of the identity data. The predetermined length can be configured to allow a few round trips of message exchange between the memory device 130 and the server system 102. Further, a subsequent request for identity data can terminate the current session and start a new session with a new session key. In some implementations, the life time of a session key is based on the power cycle events in the memory device 130. When the memory device 130 is powered up from a state of being powered down, a new session key is generated; and the session key can be valid until a next session key is generated following powering down and powering up. Optionally, a command can be sent to the memory device 130 to instruct the memory device 130 to generate a new session key.

The server system 102 determines, based on data stored in the server system 102, that the client computer system 105 is eligible to control the memory device 130. For example, the client privilege data 127 and memory device permission data 129 can be used to determine whether the client computer system 105 is eligible to control the memory device 130.

The server system 102 generates, a first digital signature 243 for a command 239 using at least a cryptographic key 124 stored in the server system in association with the memory device 130.

For example, the first digital signature 243 is applied to a first message in a request 245 from the client computer system 105 to the memory device 130. The first message includes the command 239 and a first cryptographic nonce 247 that is different from the second cryptographic nonce 227.

For example, the first digital signature 243 can include a Hash-based Message Authentication Code (HMAC) generated from the first message and a cryptographic key 124 (or the session key 223) that is stored in both the memory device 130 and the server system 102.

In general, the first digital signature 243 can be generated using the session key 223, a cryptographic key 124 stored in the server system 102 in association with the unique identification 122 of the memory device 130, or another key, or any combination thereof, using symmetric cryptography, or asymmetric cryptography, or Hash-based Message Authentication Code (HMAC).

The server system 102 transmits, via the connection 201, the first digital signature 243 to the client computer system 105.

The client computer system 105 submits the command 239 with the first digital signature 243 to the memory device 130.

The memory device 130 validates the first digital signature 243 prior to execution of the command 239.

For example, when executed in the memory device 130, the command 239 causes the memory device 130 to activate a security feature of the memory device 130.

For example, when executed in the memory device 130, the command causes 239 the memory device 130 to replace a first cryptographic key with a second cryptographic key.

For example, the second cryptographic key is generated in the memory device 130 based on a unique device secret (UDS) that is stored in the memory device 130 and in the server system 102. The server system 102 can generate, independently from the memory device 130, the second cryptographic key from the unique device secret (UDS) stored in the server system 102 and thus avoid the need to transmit the second cryptographic key between the server system 102 and the memory device 130. Alternatively, the second cryptographic key can be transmitted between the server system 102 and the memory device 130 in an encrypted form of cipher text generated using the session key 223. Alternatively, the second cryptographic key can be generated based on the session key 223.

For example, the session key 223 can be used to encrypt at least a portion of data transmitted from the server system 102 via the client computer system 105 to the memory device 130 for the execution of the command 239.

For example, the session key 223 can be used to decrypt at least a portion of a response, generated from the execution of the command 239 and transmitted to the server system 102 via the client computer system 105 from the memory device 130.

For example, the server system 102 can generate the first cryptographic nonce 247 for the command 239 and the second cryptographic nonce 227 for the identity data. The first cryptographic nonce 247 and the second cryptographic nonce 227 can be provided to the memory device 130 via the client computer system 105. Alternatively, the client computer system 105 and/or the memory device 130 can generate the first cryptographic nonce 247 and the second cryptographic nonce 227. For example, a cryptographic nonce (e.g., 227 or 247) can be generated using a random number generator and used once in the generation and verification of one digital signature (e.g., 229 or 243).

In some instances, it is desirable to transfer, from the server system 102 to a client computer system 105, the control of a set of memory devices (e.g., 130) together in a batch operation. The client computer system 105 may apply the controls to the memory devices (e.g., 130) while there is no real time communication channel between the individual memory devices (e.g., 130) and the server system 102.

In one embodiment, a batch identification is configured to represent a set of memory devices (e.g., 130) having different unique identifications (UIDs) (e.g., 122). The client computer system 105 can use the batch identification to request a set of control data for the set of memory devices (e.g., 130) respectively. The control data can be used by the client computer system 105 to control or configure security operations of the set of memory devices (e.g., 130) without further contacting the server system 102, as discussed below.

Figure 6:
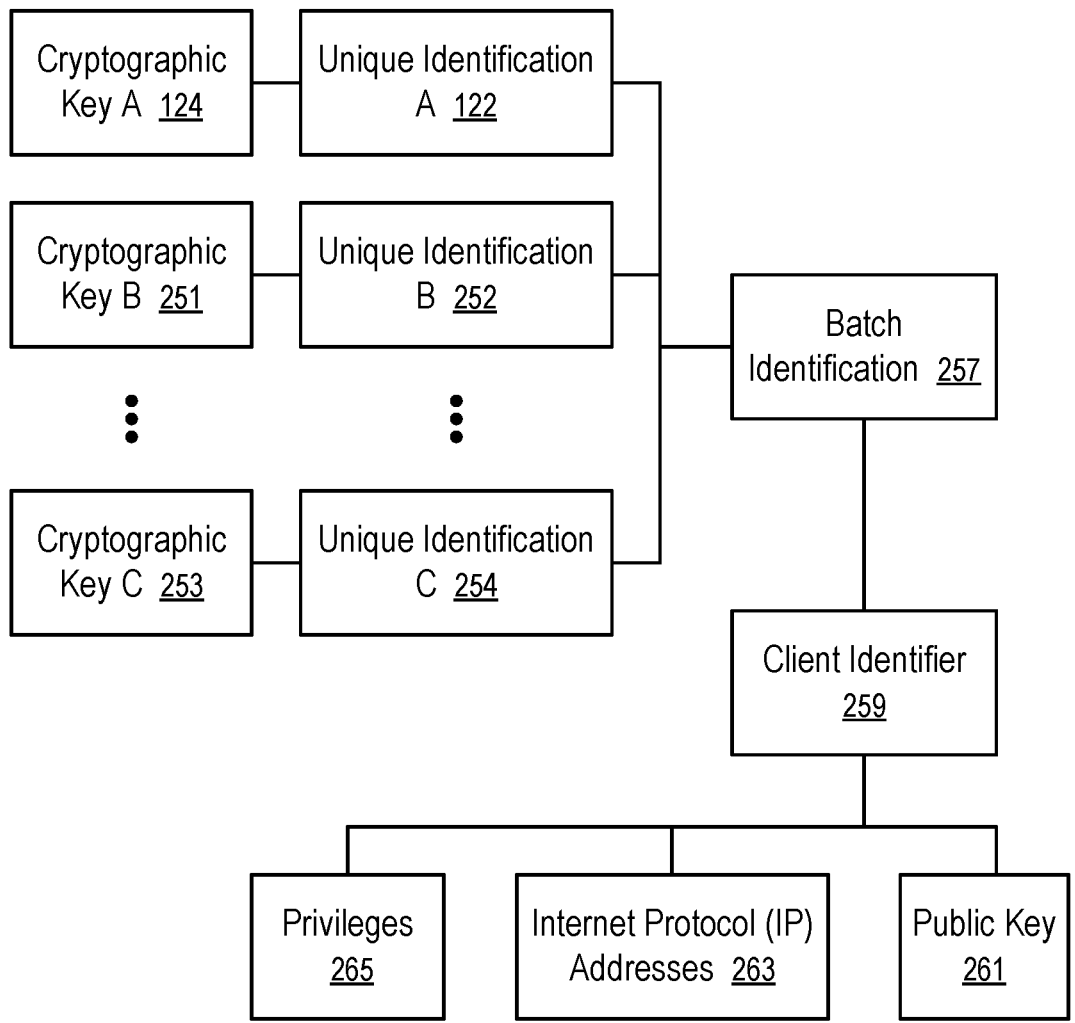
FIG. 6 shows a technique to group memory devices in a batch to transfer control according to one embodiment.

FIG. 6 shows a technique to group memory devices in a batch to transfer control according to one embodiment.

In FIG. 6, a batch identification 257 is configured in the server system 102 to represent the unique identifications 122, 252, . . . , 254 of different memory devices (e.g., 130). The set of memory devices (e.g., 130) is arranged to be controlled by a single entity, such as the operator of the client computer system 105.

For example, during the manufacture of the memory devices (e.g., 130), the unique device secrets of the memory devices (e.g., 130) are identified in a secure facility and registered with their respective unique identifications 122, 252, . . . , 254 in the key management server 103. For example, the unique device secrets of the memory devices (e.g., 130) can be cryptographic keys 124, 251, . . . , 253 or secrets used to generate the cryptographic keys 124, 251, . . . , 253.

Optionally, the memory devices (e.g., 130) can be manufactured to store the batch identification 257. For example, the batch identification 257 can be a common portion of the unique identifications 122, 252, . . . , 254 of the memory devices.

Alternatively, the association of a memory device (e.g., 130) with the batch identification 257 is not hard wired in the memory device (e.g., 130). The server system 102 can store data that associates selected unique identifications 122, 252, . . . , 254 of respective memory devices (e.g., 130) with the batch identification 257.

After a transaction that allows a client entity, such as a manufacturer of computing devices in which the memory devices (e.g., 130) are installed, to control the memory devices (e.g., 130), the batch identification 257 can be associated with, in the server system 102, a client identifier 259 that is representative of the client entity. For example, the client privilege data 127 can include data indicating that the client entity represented by the client identifier 259 has purchased the batch of memory devices (e.g., 130) represented by the batch identification 257 and thus has privileges 265 to control the memory devices (e.g., 130) in the batch. A public key 261 of the client entity can be used to validate the certificate 121 from the client entity operating the client computer system 105 to establish a secure authenticated connection 201 with the server system 102. A list of Internet Protocol (IP) addresses 263 of the client computer system 105 can be used to control request for secure authenticated connections (e.g., 201).

Figure 7:
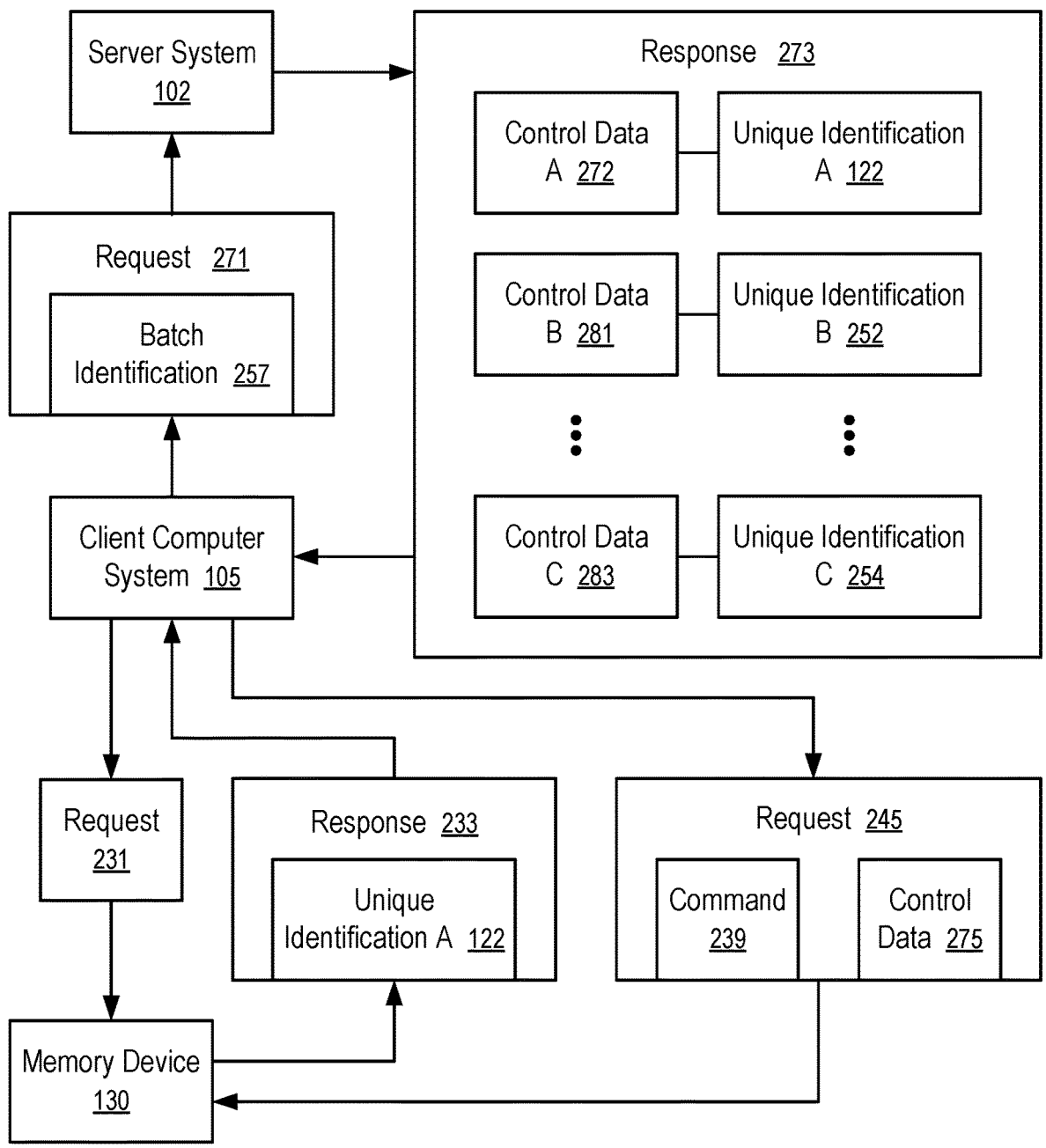
FIG. 7 shows a technique to batch transfer control of memory devices over computer networks according to one embodiment.

After the batch identification 257 is associated, in the server system 102, with the unique identifications 122, 252, . . . , 254 and the privileges 265 of the client identifier 259, the batch identification 257 can be used by the client computer system 105 to request control data for the entire set of memory devices (e.g., 130) having the different unique identifications 122, 252, . . . , 254. The control data can be used by the client computer system 105 to configure the security aspects of the memory devices (e.g., 130), as illustrated in FIG. 7. In one implementation, the key management server 103 stores data associating the batch identification 257 with the unique identifications 122, 252, . . . , 254 but not data associating the batch identification 257 with the client identifier 259; and the access control server 101 stores data associating the batch identification 257 with the client identifier 259 but not data associating the batch identification 257 with the unique identifications 122, 252, . . . , 254. Thus, neither the access control server 101 nor the key management server 103 can associate a memory device with a client identifier on their own. The server system 102 having the access control server 101 and the key management server 103 has sufficient data to associate each individual unique identification (e.g., 122, 252, . . . , or 254) of a memory device with a client identifier 259.

FIG. 7 shows a technique to batch transfer control of memory devices over computer networks according to one embodiment.

In FIG. 7, the client computer system 105 can establish a secure authenticate connection 201 to the server system 102 in a way as illustrated in FIG. 1.

Using the connection 201 to the server system 102, the client computer system 105 can transmit a request 271 that contains the batch identification 257.

For example, the batch identification 257 can be retrieved from one of the memory devices (e.g., 130) identified by the batch identification 257. For example, when the batch identification 257 is a part of the unique identification 122 of a memory device 130, the request 271 can include the unique identification 122 to provide the batch identification 257. Alternatively, when the batch identification 257 is not stored in the memory devices (e.g., 130), the client computer system 105 can obtain the batch identification 257 from the record of a transaction for acquiring the memory devices (e.g., 130).

After verifying that the client computer system 105 is eligible to control the memory devices identified by the batch identification 257, the server system 102 provides a response 273 to the client computer system 105. The response 273 includes control data 272, 281, . . . , 283 for the respective unique identifications 122, 252, . . . , 254 of the memory devices (e.g., 130) that are represented by the batch identification 257.

After the client computer system 105 obtains the response 273, the client computer system 105 can control the memory devices (e.g., 130) represented by the batch identification 257, without further communications with the server system 102.

For example, after receiving the response 273, the client computer system 105 can send a request 231 for identity data of the memory device 130, as in FIG. 4. In response, the memory device 130 can generate a response 233 that contains the unique identification 122 of the memory device 130. Based on the unique identification 122 provided in the response 233, the client computer system 105 can select, from the response 273, the corresponding control data 272 for configuring security aspects of the memory device 130.

Optionally, the control data 272 provided by the server system 102 for the unique identification 122 includes data that can be used to validate the digital signature 229 included in the response 233. For example, the control data 272 can include a cryptographic nonce 227 to be transmitted with the request 231 for the identity data of the memory device 130. Further, the control data 272 can include an expected digital signature 229 computed based on an expected value 225 of the counter 221 of the memory device 130 when the digital signature 229 is to be validated using a same cryptographic key 124 that is used to create the digital signature 229. Alternatively, when the digital signature 229 is created using a private key of the memory device 130 and asymmetric cryptography, the control data 272 can include a corresponding public key for the validation of the digital signature 229.

Optionally, the client computer system 105 may skip the validation of the digital signature 229 and trust that the memory device 130 is authentic.

In one example, the client computer system 105 initially requests identity data from the memory device 130 without knowing the unique identification 122 of the memory device 130. From the response to the initial request, the client computer system 105 determines the unique identification 122 of the memory device 130 and uses the unique identification 122 to retrieve the control data 272 associated with the unique identification 122 in the batch response 273. For example, the batch response 273 can include the cryptographic nonce 227 that can be used in a subsequent request 231 for identity data from the memory device 130. The identity data in the subsequent response 233 can be validated via the control data 272 provided by the server system 102.

Alternatively, a same cryptographic nonce 227 can be used once for each memory device (e.g., 130) in the batch; and thus, the initial request for the purpose of determine the unique identification 122 and the cryptographic nonce 227 can be skipped.

Using the control data 272 provided for the unique identification 122 of the memory device 130, the client computer system 105 can generate a request 245 for the memory device 130 to execute a command 239. For example, the command 239 can be executed to activate a security feature, or to replace a cryptographic key in the memory device 130, etc.

The request 245 can include the command 239 and control data 275 generated for the command 239 using the control data 272 provided in the response 273 for the batch identification 257.

For example, the control data 275 can include a cryptographic nonce 247 for the command 239 and a digital signature 243 that is to be validated by the memory device 130 for the execution of the command 239. The cryptographic nonce 247 can be included in the control data 272 received from the server system 102; and the digital signature 243 can be pre-generated by the server system 102 using a secret cryptographic key 124 or a session key 223. For example, the session key 223 can be established, as in FIG. 4, based on the response 233 using the secret cryptographic key 124, the cryptographic nonce 247, the counter value 225, the digital signature 229, and/or another secret of the memory device 130 known to the memory device 130 and the server system 102.

Optionally, the control data 272 can include a secret cryptographic key 124 that the server system 102 has in association with the unique identification 122 of the memory device 130 for the control of the memory device 130. With the secret cryptographic key 124, the client computer system 105 has the same control privileges, associated with the secret cryptographic key 124, as the server system 102. Optionally, after the secret cryptographic key 124 is provided to the client computer system 105, the server system 102 may erase the secret cryptographic key 124 from the server system 102; and thus, the control privileges associated with the secret cryptographic key 124 are transferred to the client computer system 105.

Figure 8:
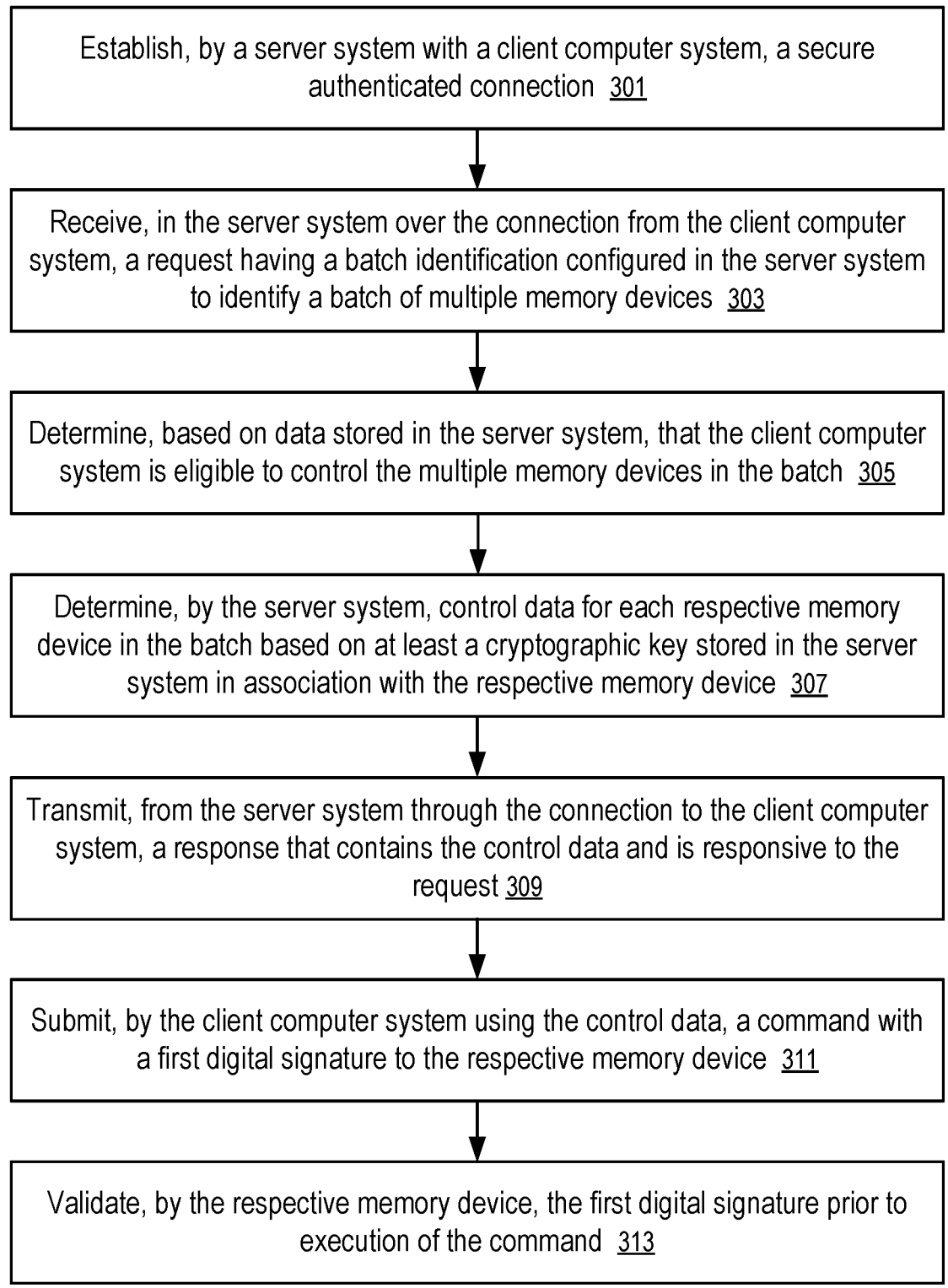
FIG. 8 shows a method to control a memory device according to one embodiment.

FIG. 8 shows a method to control a memory device according to one embodiment. The method of FIG. 8 can be performed by processing logic that can include hardware (e.g., processing device, circuitry, dedicated logic, programmable logic, microcode, hardware of a device, integrated circuit, etc.), software/firmware (e.g., instructions run or executed on a processing device), or a combination thereof. In some embodiments, the method of FIG. 8 is performed at least in part by the server system 102 of FIG. 1, FIG. 4, FIG. 5, and/or FIG. 7. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 301, a server system 102 establishes with a client computer system 105 a connection (e.g., a secure authenticated connection 201).

At block 303, the server system 102 receives, over the connection 201 and from the client computer system 105, a request 271 having a batch identification 257 that is configured in the server system 102 to identify a batch of multiple memory devices (e.g., 130).

For example, as illustrated in FIG. 6, multiple memory devices (e.g., 130) have different unique identifications 122, 252, . . . , 254. The batch identification 257 can be used to identify the entire set of unique identifications 122, 252, . . . , 254 of the memory devices (e.g., 130).

At block 305, the server system 102 determines, based on data stored in the server system 102, that the client computer system 105 is eligible to control the multiple memory devices in the batch.

For example, the server system 102 can store data associating the batch identification 257 with the client identifier 259 of the client computer system 105 and/or the privileges 265 of the client computer system 105 to control one or more batches of memory devices (e.g., 130).

In response to the determination that the client computer system 105 is eligible to control the memory devices (e.g., 130), at block 307, the server system 102 determines control data (e.g., 272) for each respective memory device (e.g., 130) in the batch based on at least a cryptographic key (e.g., 124) stored in the server system 102 in association with the respective memory device (e.g., 130).

For example, the control data 272 for the unique identification 122 can include a cryptographic key that can be used to validate a second digital signature 229 applied on identity data provided in a response 233 when the client computer system 105 sends a request 231 for the identity data.

Alternatively, the control data 272 can include the second digital signature 229 that the server system 102 expects the memory device 130 to generate in response to the request 231 for the identity data. The second digital signature 229 is to be applied on a second message having an unique identification 122 of the respective memory device 130, a value 225 from a counter 221 configured in the respective memory device 130, and a second cryptographic nonce 227. The server system 102 can determine a second cryptographic nonce 227 for the request 231 and determine an expected counter value of the memory device 130 (e.g., based on the last seen value of the counter 221 of the memory device 130). The server system 102 can use a cryptographic key 124 of the memory device 130 to compute the expected digital signature that is be applied by the memory device 130 on a response 233 to a request 231 for the identity data of the memory device 130. The control data 272 can include the second cryptographic nonce 227, the expected counter value, and the expected digital signature. The client computer system 105 can send the request 231 with the second cryptographic nonce 227 to cause the memory device 130 to provide a response 233 having a counter value 225 that matches with the expected counter value. Then, the expected digital signature provided in the control data 272 can be compared to the second digital signature 229 in the identity data response 233 to determine whether the signatures match with each other and thus whether the memory device 130 is authentic. When the memory device 130 produces the response 233 having the matching digital signature 229, the memory device 130 also has the session key 223, which may be used in the processing of the request 245 for the execution of the command 239.

At block 309, the server system 102 transmits, through the connection 201 to the client computer system 105, a response 273 that contains the control data (e.g., 272) and is responsive to the request 271.

After receiving the response 273, the client computer system 105 can control security aspects of the respective memory device (e.g., 130) in the batch without further communications with the server system 102.

At block 311, the client computer system 105 uses the control data (e.g., 272) to submit a command 239 with a first digital signature 243 to the respective memory device (e.g., 130).

For example, the first digital signature 243 is applied to a first message in a request 245 from the client computer system 105 to the memory device 130. The first message includes the command 239 and a first cryptographic nonce 247.

For example, the first digital signature 243 includes a Hash-based Message Authentication Code (HMAC) generated from the first message and a cryptographic key that is stored in both the respective memory device and the server system. The control data 272 provided in the batch response 273 can include the cryptographic key to generate the first digital signature 243, or include the first cryptographic nonce 247 and the first digital signature 243 generated by the server system 102 for the client computer system 105.

For example, the first digital signature 243 can be generated using the session key 223 established in the respective memory device 130 in response to a request 231 for identity data of the respective memory device 130, or a cryptographic key stored in the server system 102 in association with the unique identification 122 of the respective memory device 130, or any combination thereof.

For example, the control data 272 can include the first digital signature 243 by the server system 102 for the client computer system 105, or a cryptographic key that can be used by the client computer system 105 to generate the first digital signature 243 independently from the server system 102.

At block 313, the respective memory device (e.g., 130) validates the first digital signature 243 prior to execution of the command 239.

For example, the command 239 can be executed in the respective memory device (e.g., 130) to activate a security feature of the respective memory device (e.g., 130), to replace a first cryptographic key with a second cryptographic key, or any combination thereof.

Figure 9:
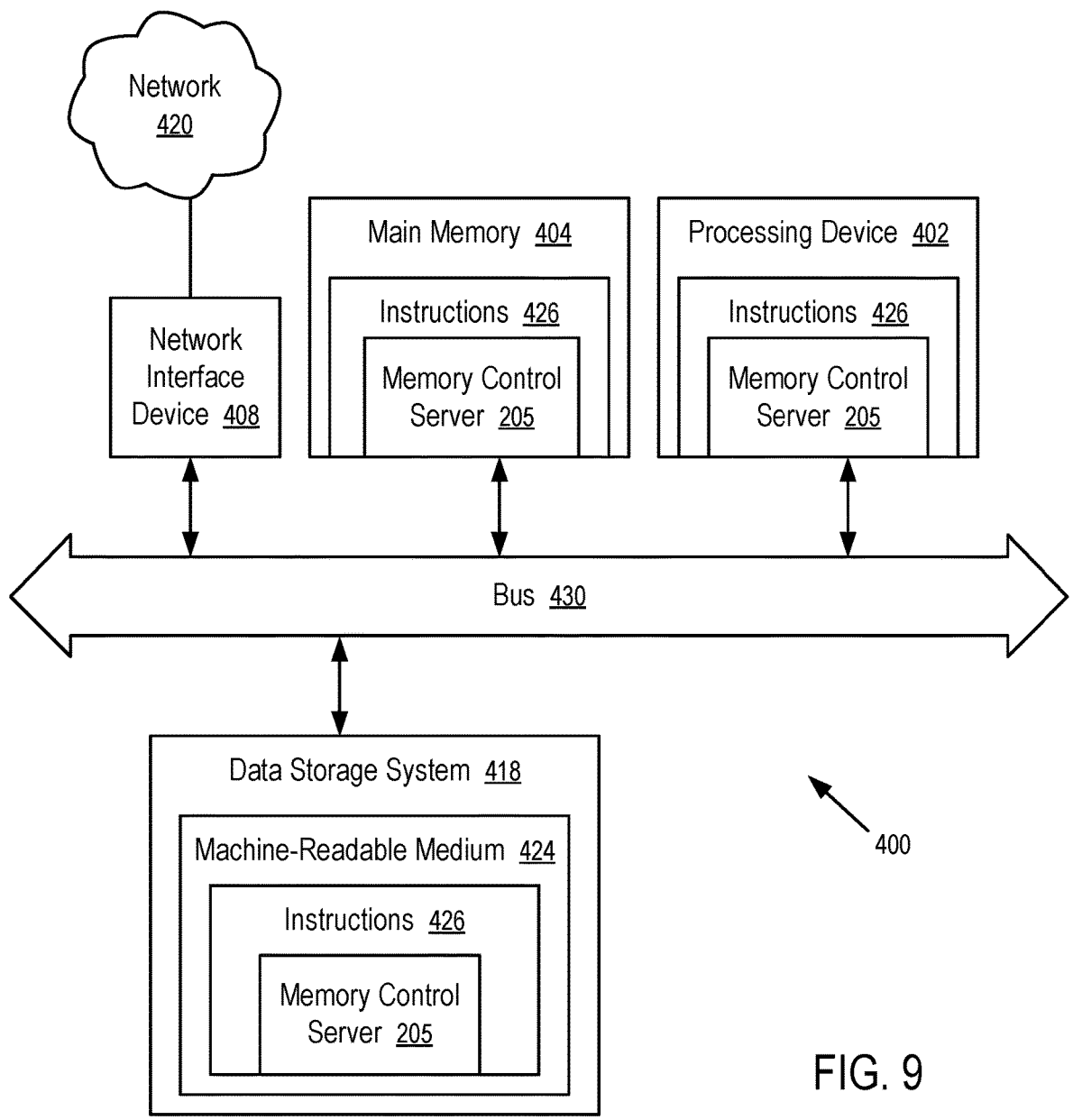
FIG. 9 is a block diagram of an example computer system in which embodiments of the present disclosure can operate.

FIG. 9 illustrates an example machine of a computer system 400 within which a set of instructions, for causing the machine to perform any one or more of the methodologies discussed herein, can be executed. In some embodiments, the computer system 400 can correspond to a server system 102 (e.g., the server system 102 of FIG. 1) that includes, is coupled to, or utilizes a memory sub-system (e.g., the memory sub-system 110 of FIG. 2) or can be used to perform the operations of a memory control server 205 (e.g., to execute instructions to perform operations corresponding to the server system 102) described with reference to FIGS. 1-8. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 418, which communicate with each other via a bus 430 (which can include multiple buses).

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable medium 424, data storage system 418, and/or main memory 404 can correspond to the memory sub-system 110 of FIG. 2.

In one embodiment, the instructions 426 include instructions to implement functionality corresponding to an access control server 101 (e.g., the access control server 101 described with reference to FIGS. 1-8). While the machine-readable medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   establishing, by a server system with a client computer system, a secure authenticated connection;
   receiving, in the server system over the connection from the client computer system, a request having a batch identification configured in the server system to identify a batch of multiple memory devices;
   determining, based on data stored in the server system, that the client computer system is eligible to control the multiple memory devices in the batch; and
   transmitting, from the server system through the connection to the client computer system, a response to the request, the response containing control data for each respective memory device in the batch, the control data being based on at least a cryptographic key stored in the server system in association with the respective memory device, wherein using the control data the client computer system is to submit a command with a first digital signature to the respective memory device, the respective memory device to validate the first digital signature prior to execution of the command.

2. The method of claim 1, wherein the server system includes a key management server and an access control server; the key management server stores data associating the batch identification with identifications of the multiple memory devices but no data associating the batch identification with an identification of the client computer system; the access control server stores data associating the batch identification with the identification of the client computer system but no data associating the batch identification with identifications of the multiple memory devices; and when executed in the respective memory device, the command causes the respective memory device to activate a security feature of the respective memory device, to replace a first cryptographic key with a second cryptographic key, or any combination thereof.

3. The method of claim 2, wherein the first digital signature is applied to a first message in a request from the client computer system to the respective memory device; and the first message includes the command and a first cryptographic nonce.

4. The method of claim 3, wherein the first digital signature includes a Hash-based Message Authentication Code (HMAC) generated from the first message and the cryptographic key that is stored in both the respective memory device and the server system.

5. The method of claim 4, wherein the control data includes the cryptographic key.

6. The method of claim 4, wherein the control data includes the first cryptographic nonce and the first digital signature.

7. The method of claim 3, wherein the control data includes a cryptographic key usable to validate a second digital signature applied on identity data generated by the respective memory device.

8. The method of claim 3, further comprising:
   determining, by the server system, identity data of the respective memory device;
   computing a session key based on the determining of the identity data;
   wherein the respective memory device is to generate, independent from the server system, the identity data in response to a request from the client computer system after the client computer system receives the control data; and
   wherein the control data is usable by the client computer system to validate a second digital signature in the identity data generated by the respective memory device.

9. The method of claim 8, wherein the identity data generated by the respective memory device includes a second message and the second digital signature applied on the second message using a secret cryptographic key of the respective memory device; the second message includes a unique identification of the respective memory device, a value from a counter configured in the respective memory device, and a second cryptographic nonce; and the request from the client computer system to the respective memory device for the identity data includes the second cryptographic nonce received in the response to the request having the batch identification.

10. The method of claim 9, wherein the control data includes a version of the second digital signature generated by the server system.

11. The method of claim 9, wherein the first digital signature is generated using the session key, or a cryptographic key stored in the server system in association with the unique identification of the respective memory device, or any combination thereof.

12. The method of claim 11, wherein the control data includes the first digital signature.

13. The method of claim 11, wherein the control data includes a cryptographic key to generate the first digital signature.

14. A computing system, comprising:
  memory storing cryptographic keys of memory devices and data indicative privileges of client computer systems to control the memory devices; and
  at least one processor configured via a set of instructions to:
    establish, with a client computer system, a secure authenticated connection;
    receive, from the client computer system via the connection, a request having a batch identification configured in the computing system to identify a batch of multiple memory devices;
    determine, based on data stored in the computing system, that the client computer system is eligible to control the multiple memory devices in the batch; and
    transmit, to the client computer system via the connection, a response to the request, the response containing control data for each respective memory device in the batch, the control data being based on at least a cryptographic key stored in the computing system in association with the respective memory device, wherein using the control data the client computer system is to submit a command with a first digital signature to the respective memory device, the respective memory device to validate the first digital signature prior to execution of the command.

15. The computing system of claim 14, wherein when executed in the respective memory device, the command causes the respective memory device to activate a security feature of the respective memory device, to replace a first cryptographic key with a second cryptographic key, or any combination thereof; and the first digital signature is applied to a first message in a request from the client computer system to the respective memory device; and the first message includes the command and a first cryptographic nonce.

16. The computing system of claim 15, wherein the first digital signature includes a Hash-based Message Authentication Code (HMAC) generated from the first message and a cryptographic key that is stored in both the respective memory device and the computing system; and the control data includes the cryptographic key or includes the first cryptographic nonce and the first digital signature.

17. The computing system of claim 15, wherein the at least one processor is further configured via a set of instructions to:
  determine identity data of the respective memory device;
  compute a session key based on the determining of the identity data;
  wherein the respective memory device is to generate, independent from the computing system, the identity data in response to a request from the client computer system after the client computer system receives the control data;
  wherein the control data is usable by the client computer system to validate a second digital signature in the identity data generated by the respective memory device;
  wherein the identity data generated by the respective memory device includes a second message and the second digital signature applied on the second message using a secret cryptographic key of the respective memory device;
  wherein the second message includes a unique identification of the respective memory device, a value from a counter configured in the respective memory device, and a second cryptographic nonce; and
  wherein the request from the client computer system to the respective memory device for the identity data includes the second cryptographic nonce received in the response to the request having the batch identification.

18. The computing system of claim 17, wherein the first digital signature is generated using the session key, or a cryptographic key stored in the computing system in association with the unique identification of the respective memory device, or any combination thereof; and the control data includes the first digital signature or a cryptographic key to generate the first digital signature.

19. A non-transitory computer storage medium storing instructions which, when executed by a computing system, cause the computing system to perform a method, the method comprising:
  establishing, by the computing system with a client computer system, a secure authenticated connection;
  receiving, in the computing system over the connection from the client computer system, a request having a batch identification configured in the computing system to identify a batch of multiple memory devices;
  determining, based on data stored in the computing system, that the client computer system is eligible to control the multiple memory devices in the batch; and
  transmitting, from the computing system through the connection to the client computer system, a response to the request, the response containing control data for each respective memory device in the batch, the control data being based on at least a cryptographic key stored in the computing system in association with the respective memory device, wherein using the control data the client computer system is to submit a command with a first digital signature to the respective memory device, the respective memory device to validate the first digital signature prior to execution of the command.

20. The non-transitory computer storage medium of claim 19, wherein when executed in the respective memory device, the command causes the respective memory device to activate a security feature of the respective memory device, to replace a first cryptographic key with a second cryptographic key, or any combination thereof; and the first digital signature is applied to a first message in a request from the client computer system to the respective memory device; the first message includes the command and a first cryptographic nonce; and the control data includes the first digital signature or a cryptographic key to generate the first digital signature.

* * * * *